(12) United States Patent
Drako et al.

(10) Patent No.: US 8,204,948 B2
(45) Date of Patent: Jun. 19, 2012

(54) QUERYING A DATABASE AND RECEIVING REPLIES IN IPV6 FORMAT BY UTILIZING WELL KNOWN PORT 53

(75) Inventors: Dean Drako, Los Altos, CA (US);
Zachary Levow, Mountain View, CA (US)

(73) Assignee: Barracuda Networks, Inc., Campbell, CA (US)

( * ) Notice: Subject to any disclaimer, the term of this patent is extended or adjusted under 35 U.S.C. 154(b) by 13 days.

(21) Appl. No.: 12/854,871

(22) Filed: Aug. 11, 2010

(65) Prior Publication Data

US 2011/0022670 A1    Jan. 27, 2011

Related U.S. Application Data

(62) Division of application No. 12/167,547, filed on Jul. 3, 2008, now Pat. No. 7,996,475.

(51) Int. Cl.
*G06F 15/16* (2006.01)

(52) U.S. Cl. .......................... 709/206; 709/204; 709/203

(58) Field of Classification Search .................... 709/206
See application file for complete search history.

(56) References Cited

U.S. PATENT DOCUMENTS

2005/0210106 A1* 9/2005 Cunningham ................. 709/206
2007/0294352 A1* 12/2007 Shraim et al. ................. 709/206

* cited by examiner

*Primary Examiner* — Wing Chan
*Assistant Examiner* — Andrew Woo
(74) *Attorney, Agent, or Firm* — Patentry

(57) ABSTRACT

Facilitating email transmission by extracting email parameters, requesting data in the form of a dns query, and receiving a sender reputation as an IP address. Querying a database by sending a plurality of arguments concatenated to a dns request and receiving an IP address in reply. Operating a remote database as a dns server, receiving queries as domains and transmitting replies in the format of IPv4 or IPv6 addresses. Filtering email by querying a database with email parameters comprising an IP address and a domain of an email sender which may be extracted from an email header in the HELO, EHLO, MAIL FROM, or RETURN PATH. The smtp session is continued, modified or interrupted according to the result of the query submitted to a database operating as a dns server.

12 Claims, 4 Drawing Sheets

QUERYING A DATABASE AND RECEIVING REPLIES IN IPV6 FORMAT BY UTILIZING WELL KNOWN PORT 53

CO-PENDING APPLICATIONS

This is a divisional application filed under 37 CFR 1.53(b) filed as a result of a restriction requirement made by the examiner of utility application Ser. No. 12/167,547. The divisional application claims the benefit of the prior nonprovisional application under 35 USC 121 and the filing date of Jul. 3, 2008 which is incorporated in its entirety by reference. Three related applications with common inventors and assignee are pending: requesting a service or transmitting content as a dns resolver, operating a service as a dns server, and facilitating email by checking a database with email coordinates.

| application numbers: | file dates: |
| --- | --- |
| 12167524 | Jul. 3, 2008 |
| 12167134 | Jul. 2, 2008 |
| 12167547 | Jul. 3, 2008 |

TECHNICAL FIELD

The field of the invention is Internet based database operations and an application to facilitating the transmission of email.

DEFINITION LIST 1

| Term | Definition |
| --- | --- |
| Email parameter | A text string which is either part of an argument of a mail protocol command or a component of a TCP packet header connecting between email servers. Not limited to but includes IP addresses and domain names. The present application defines and uses this term. |
| IP address e.g. 151.207.245.67 | An internet protocol (IP) address is defined in RFC-791 IPv4 standard of the Internet Engineering Task Force. RFC-791 defines a replacement IPv6. |
| Domain name e.g. www.uspto.gov | Defined in RFC-1034, 1035, 1085, a domain name is a memorable host name that stands in for a numeric IP address. |
| DNS | Domain Name System defined in RFC 1035, includes resolvers and servers which respond to questions about domain names. The most basic task of DNS is to translate hostnames to IP addresses. The Domain Name System consists of a hierarchical set of DNS servers. |
| SMTP | Simple Mail Transfer Protocol documented in RFC 2821 |
| DNSBL | DNSBL is an abbreviation that usually stands for "DNS blacklist". Typically entails a domain, a nameserver for that domain, and a list of addresses to publish. Generally returns either an address, indicating that the client is listed; or an "NXDOMAIN" ("No such domain") code. DNSBL provides resources to support blocking spam. |
| Fully qualified domain name | A fully qualified domain name has at least a host and domain name, including top-level domain. A FQDN always starts with a host name and continues all the way up to the top-level domain name and includes intermediate level domains to provide an unambiguous path which specifies the exact location of a host in the Domain Name System's tree hierarchy through to a top-level domain |

Domain Names System Background

A domain name usually consists of two or more parts (technically labels), separated by dots. For example: example.com.

The rightmost label conveys the top-level domain (for example, the address www.example.com has the top-level domain com).

Each label to the left specifies a subdivision, or subdomain of the domain above it. Note; "subdomain" expresses relative dependence, not absolute dependence. For example: example.com comprises a subdomain of the com domain, and www.example.com comprises a subdomain of the domain example.com. In theory, this subdivision can go down to 127 levels deep. Each label can contain up to 63 characters. The whole domain name does not exceed a total length of 255 characters. In practice, some domain registries may have shorter limits.

A hostname refers to a domain name that has one or more associated IP addresses; ie: the 'www.example.com' and 'example.com' domains are both hostnames, however, the 'com' domain is not.

DNS Servers

The Domain Name System consists of a hierarchical set of DNS servers. Each domain or subdomain has one or more authoritative DNS servers that publish information about that domain and the name servers of any domains "beneath" it. The hierarchy of authoritative DNS servers matches the hierarchy of domains. At the top of the hierarchy stand the root nameservers: the servers to query when looking up (resolving) a top-level domain name (TLD).

Users generally do not communicate directly with DNS. Instead DNS-resolution takes place transparently in client-applications such as web-browsers, mail-clients, and other Internet applications. When an application makes a request which requires a DNS lookup, such programs send a resolution request to the local DNS resolver in the local operating system, which in turn handles the communications required.

The DNS resolver likely has a cache containing recent lookups. If the cache can provide the answer to the request, the resolver will return the value in the cache to the program that made the request. If the cache does not contain the answer, the resolver will send the request to one or more designated DNS servers.

When a DNS client needs to look up a name used in a program, it queries DNS servers to resolve the name. Each query message the client sends contains three pieces of information, specifying a question for the server to answer:

A specified DNS domain name, stated as a fully qualified domain name (FQDN)

A specified query type, which can either specify a resource record by type or a specialized type of query operation.

A specified class for the DNS domain name.

For example, the name specified could be the FQDN for a computer, such as "host-a.example.com.", and the query type specified to look for an address (A) resource record by that name. Think of a DNS query as a client asking a question, such as "Do you have any A resource records for a computer named 'hostname.example.com.'?" When the client receives an answer from the server, it reads and interprets the answered A resource record, learning the IP address for the computer it asked for by name.

DNS queries resolve in a number of different ways. A client can sometimes answer a query locally using cached information obtained from a previous query. The DNS server can use its own cache of resource record information to answer a query. A DNS server can also query or contact other DNS servers on behalf of the requesting client to fully resolve the name, then send an answer back to the client. This process is known as recursion.

In addition, the client itself can attempt to contact additional DNS servers to resolve a name. In general, the DNS query process occurs in two parts:

A name query begins at a client computer and is passed to a resolver, the DNS Client service, for resolution.

When the query cannot be resolved locally, DNS servers can be queried as needed to resolve the name.

In the initial steps of the query process, a DNS domain name is used in a program on the local computer. The request is then passed to the DNS service for resolution using locally cached information. If the queried name can be resolved, the query is answered and the process is completed. If the query does not match an entry in the cache, the resolution process continues with the client querying a DNS server to resolve the name.

Querying a DNS Server

A positive response can consist of the queried RR or a list of RRs (also known as an RRset) that fits the queried DNS domain name and record type specified in the query message. The resolver passes the results of the query, in the form of either a positive or negative back to the requesting program and caches the response.

How Caching Works

As DNS servers process client queries using recursion or iteration, they discover and acquire a significant store of information about the DNS namespace. This information is then cached by the server.

Caching provides a way to speed the performance of DNS resolution for subsequent queries of popular names, while substantially reducing DNS-related query traffic on the network.

As DNS servers make recursive queries on behalf of clients, they temporarily cache resource records (RRs). Cached RRs contain information obtained from DNS servers that are authoritative for DNS domain names learned while making iterative queries to search and fully answer a recursive query performed on behalf of a client. Later, when other clients place new queries that request RR information matching cached RRs, the DNS server can use the cached RR information to answer them.

When information is cached, a Time-To-Live (TTL) value applies to all cached RRs. As long as the TTL for a cached RR does not expire, a DNS server can continue to cache and use the RR again when answering queries by its clients that match these RRs. Caching TTL values used by RRs in most zone configurations are assigned the Minimum (default) TTL which is set used in the zone's start of authority (SOA) resource record. By default, the minimum TTL is 3,600 seconds (1 hour) but can be adjusted or, if needed, individual caching TTLs can be set at each RR.

Other Applications

There are many uses of the domain name system (DNS) besides translating names to IP addresses. For example, mail transfer agents use DNS to find out where to deliver e-mail for a particular address. The domain to mail exchanger mapping provided by DNS MX records tells where to deliver email for a domain.

Sender Policy Framework and DomainKeys instead of creating their own record types were designed to take advantage of another DNS record type, the TXT record. In these cases the TXT record contains a policy or a public key.

Protocol Details

DNS primarily uses UDP on port 53[4] to serve requests. Almost all DNS queries consist of a single UDP request from the client followed by a single UDP reply from the server. TCP comes into play only when the response data size exceeds 512 bytes, or for such tasks as zone transfer. Some operating systems such as HP-UX are known to have resolver implementations that use TCP for all queries, even when UDP would suffice.

Important categories of data stored in DNS include the following:

An A record or address record maps a hostname to a 32-bit IPv4 address.

An AAAA record or IPv6 address record maps a hostname to a 128-bit IPv6 address.

A CNAME record or canonical name record is an alias of one name to another. The A record to which the alias points can be either local or remote—on a foreign name server. This is useful when running multiple services (such as an FTP and a webserver) from a single IP address. Each service can then have its own entry in DNS (like ftp.example.com. and www.example.com.)

An MX record or mail exchange record maps a domain name to a list of mail exchange servers for that domain.

A PTR record or pointer record maps an IPv4 address to the canonical name for that host. Setting up a PTR record for a hostname in the in-addr.arpa domain that corresponds to an IP address implements reverse DNS lookup for that address.

An NS record or name server record maps a domain name to a list of DNS servers authoritative for that domain. Delegations depend on NS records.

An SOA record or start of authority record specifies the DNS server providing authoritative information about an Internet domain, the email of the domain administrator, the domain serial number, and several timers relating to refreshing the zone.

An SRV record is a generalized service location record.

A TXT Record was originally intended to carry arbitrary human-readable text in a DNS record. Since the early 1990s, however, this record is more often used to carry machine-readable data such as specified by RFC 1464, opportunistic encryption, Sender Policy Framework and DomainKeys such as public keys or a policy.

An NAPTR record ("Naming Authority Pointer") is a newer type of DNS record that support regular expression based rewriting.

SMTP Background

The simple mail transfer protocol (smtp) standardized as RFC2821, is widely used in most stages of delivering e-mail across the internet. The smtp protocol is built on the TCP or transmission control protocol discussed in RFC1180, and consists of commands, code, parameters, and data exchanged between clients and servers. A TCP service transmits packets whose headers contain the internet protocol (IP) address of the sending host and the receiving host.

Although the SMTP protocol provides for relay through a serial chain of clients and servers, in practice today, the sender client makes a direct connection to the receiver's server. Thus the IP header used to establish the handshake cannot be forged.

The envelope sender email address (sometimes also called the return-path) is used during the transport of the message from mail server to mail server, e.g. to return the message to the sender in the case of a delivery failure. It is usually not displayed to the user by mail programs.

The header sender address of an e-mail message is contained in the "From" or "Sender" header and is what is displayed to the user by mail programs. Generally, mail servers do not care about the header sender address when delivering a message. Spammers can easily forge these.

DNSBL Background

An early and initially successful attempt to control unsolicited bulk messages transmitted by email, commonly called spam, was called RBL. Generally, RBL's can be thought of as lists of IP addresses which had been found to have a history of transmitting spam. There are more proper definitions of RBL and more generic terms which are not historical or trademarked but common usage refers to queries that check lists of "bad" IP addresses as RBL-like.

Early attempts to block spam started with the development of a "blacklist" of known IP addresses that sent spam. This blacklist would be referenced and any email originating from one of the IP addresses on the blacklist would be rejected. The IP address is obtained from the TCP/IP packet information and cannot be forged. As people began to develop larger blacklists and share them amongst themselves the need for a more dynamic method or centralized blacklist was developed. The answer to this was what is known as the traditional Remote Black List (RBL) or Domain Name System Black List (DNSBL). A DNSBL, is a means by which an Internet site may publish a list of IP addresses that people may want to avoid, in a format which can be easily queried by computer programs on the Internet. The technology is built on top of the Internet Domain Name System (DNS). DNSBLs are chiefly used to publish lists of addresses associated with spamming. Most mail transport agent (mail server) software can be configured to reject or flag messages which have been sent from a site listed on one or more such lists. RBL originated as an abbreviation for "Real-time Blackhole List". "RBL" was the trademarked name of the first system to use this strategy, the proprietary MAPS DNSBL.

Developers of mail software have adopted configuration parameters that use "RBLs" or "RBL domains" when any DNSBLs can be used, not just the MAPS RBL. The term "rejectlist" has also been used, as well as Right Hand Side Blacklist (RHSBL), similar to a DNSBL but it listing domain names rather than IP addresses. The term comes from the "right-hand side" of an email address—the part after the @ sign—which clients look up in the RHSBL. Several services manage and maintain a list of domains used by spammers. Unfortunately, RHSBL cannot address, the growth of bots which has resulted in spammers infecting the domains of legitimate email senders and mixing their spam with non-spam from infected domains.

The first DNSBL was created in 1997 by Paul Vixie and Dave Rand as part of the Mail Abuse Prevention System (MAPS). Initially, there was a list of commands that could be used to program routers so that network operators could "blackhole" all TCP/IP traffic for machines used to send spam or host spam supporting services, such as a website. This was a reference to a theoretical physical phenomina whose gravitational force was intense enough to absorb all incident light and emit no information, the ultimate black box of information theory. Vixie, an influential Internet programmer, network administrator and Chief Technology Officer, was able to install these blackhole routines in key routers so that people would not be able to connect to these machines, even if they wanted to. The purpose of the RBL was not simply to block spam-it was to educate Internet service providers and other Internet sites about spam and related problems, such as open SMTP relays, spamvertising, etc. Before an address would be listed on the RBL, volunteers and MAPS staff would attempt repeatedly to contact the persons responsible for it and get its problems corrected. Such effort was considered ethical before blackholing all network traffic, but it also meant that spammers and spam supporting ISPs could intentionally delay being put on the RBL.

Later, the RBL was also released in a DNSBL form and Paul Vixie encouraged the authors of sendmail and other mail software to implement RBL clients. These allowed the mail software to query the RBL and reject mail from listed sites on a per mail server basis instead of blackholing all traffic.

Soon after the advent of the RBL, others started developing their own lists with different policies. One of the first was Alan Brown's Open Relay Behavior-modification System (ORBS). This used automated testing to discover and list mail servers running as open mail relays-exploitable by spammers to carry their spam. ORBS was controversial at the time because many people felt running an open relay was acceptable, and that scanning the Internet for open mail servers could be abusive. In 2003, a number of DNSBLs came under denial-of-service attacks. Since no party has admitted to these attacks nor been discovered responsible, their purpose is a matter of speculation. However, many observers believe the attacks are perpetrated by spammers in order to interfere with the DNSBLs' operation or hound them into shutting down. In August 2003, the firm Osirusoft, an operator of several DNSBLs including one based on the SPEWS data set, shut down its lists after suffering weeks of near-continuous attack.

It is possible to serve a DNSBL using any general-purpose DNS server software. However this is typically inefficient for zones containing large numbers of addresses, particularly DNSBLs which list entire Classless Inter-Domain Routing netblocks. DNSBL-specific software—such as Michael J. Tokarev's rbldnsd, Daniel J. Bernstein's rbldns, or the DNS Blacklist Plug-In for Simple DNS Plus—is faster, uses less memory, and is easier to configure for this purpose.

The hard part of operating a DNSBL is populating it with addresses. DNSBLs intended for public use usually have specific, published policies as to what a listing means, and must be operated accordingly to attain or keep public confidence.

When a mail server receives a connection from a client, and wishes to check that client against a DNSBL (let's say, dnsbl.example.net), it does more or less the following:

Take the client's IP address-say, 192.168.42.23- and reverse the bytes, yielding 23.42.168.192.

Append the DNSBL's domain name: 23.42.168.192.dnsbl.example.net.

Look up this name in the DNS as a domain name ("A" record). This will return either an address, indicating that the client is listed; or an "NXDOMAIN" ("No such domain") code, indicating that the client is not.

Optionally, if the client is listed, look up the name as a text record ("TXT" record). Most DNSBLs publish information about why a client is listed as TXT records.

There is an informal protocol for the addresses returned by DNSBL queries which match. Most DNSBLs return an address in the 127.0.0.0/8 IP loopback network. The address 127.0.0.2 indicates a generic listing. Other addresses in this block may indicate something specific about the listing-that it indicates an open relay, proxy, or spammer-owned host.

Conventional real-time blackhole list (RBL) filtering comprises prepending an IP address to an RBL domain, querying a Domain Name System (dns) server, and receiving a result. That result may be used to take action such as blocking an email received from a certain IP address.

Other proposed solutions shift the burden of establishing credibility onto innocent senders. Examples include adding sender policy framework policies or domainkey Public Keys into the dns TXT fields.

DomainKeys

In DomainKeys, U.S. Pat. No. 6,986,049 assigned to Yahoo!, the receiving SMTP server uses the name of the domain from which mail originated, the string_domainkey, and a selector from the header to perform a DNS lookup. The returned data includes the domain's public key. The receiver can then decrypt the hash value in the header field and at the same time recalculate the hash value for the mail body that was received, from the point immediately following the "DomainKey-Signature:" header. If the two values match, this cryptographically proves that the mail originated at the purported domain and has not been tampered with in transit. DomainKeys is primarily an authentication technology and does not itself filter spam. It also adds to the computational burden of both sender and receiver in encrypting/decrypting and computing/comparing hash values.

Sender Policy Framework

The Sender Policy Framework (SPF) is another emerging standard pertinent to security. Adopting SPF requires the owner of the example.org domain to designate which machines are authorized to send e-mail whose sender e-mail address ends with "@example.org". Receivers checking SPF can reject messages from unauthorized machines before receiving the body of the message. SPF uses the authority delegation scheme of the Domain Name System. A syntax defines a policy in a domain's DNS records, typically TXT.

A proposal to merge Microsoft Caller ID and SPF was submitted to the IETF MARID working group. Caller ID and SPF aimed to prevent spoofing by confirming what domain a message came from and thereby increase the effectiveness of spam filters. Under the merged proposal, organizations would have published information about their outgoing e-mail servers, such as IP addresses, in the Domain Name System (DNS) using the industry-standard XML format. The converged specification included testing at both the message transport (SMTP) level, or envelope, as originally proposed in SPF, as well as in the message body headers, as originally proposed in Caller ID. Testing for spoofing at the message transport level was suggested to block some spam messages before they are sent. In cases in which a deeper examination of the message contents is required to detect spoofing and phishing attacks, the Caller ID-style header check would apply. However the MARID working group self-terminated without success.

The main benefit of SPF is to people whose e-mail addresses are forged in the Return-Paths. They receive a large mass of undeserved and worrisome error messages and other auto-replies, making it difficult to use e-mail normally. (Am I infected with a virus, did someone access my computer without authorization, shall I change all my passwords?) If such people use SPF to specify their legitimate sending IPs with a FAIL result for all other IPs, then receivers checking SPF can reject forgeries, possibly reducing the amount of back-scatter. This is an indirect benefit and has not been sufficiently motivating to cause adoption.

SPF may offer advantages beyond potentially helping identify unwanted e-mail. In particular, if a sender provides SPF information, then receivers can use SPF PASS results in combination with a white list to identify known reliable senders.

The Sender Policy Framework (SPF) standard specifies a technical method to prevent sender address forgery. Present implementations of the SPF concept protects the envelope sender address, which is used for the delivery of messages.

SPF allows the owner of an Internet domain to use a special format of DNS TXT records to specify which IP addresses are authorized to transmit e-mail for that domain. SPF allows software to identify and reject forged addresses in the SMTP MAIL FROM (Return-Path), a typical nuisance in e-mail spam. SPF is defined in RFC 4408. In using SPF domains identify the machines authorized to send e-mail on their behalf. Domains do this by adding additional records to their existing DNS information. Some examples of policies:
TXT v=spf1 include:spf-a.hotmail.com include:spf-b.hotmail.com include:spf-c.hotmail.com include:spf-d.hotmail.com ~all
TXT spf2.0/pra ip4:152.163.225.0/24 ip4:205.188.139.0/24 ip4:205.188.144.0/24 ip4:205.188.156.0/23 ip4:205.188.159.0/24 ip4:64.12.136.0/23 ip4:64.12.138.0/24 ip4:64.12.143.99/32 ip4:64.12.143.100/32 ip4:64.12.143.101/32 ptr:mx.aol.com ?all The format which has been adopted as a standard has been criticized as awkward. The distributed nature of DNS records could be advantageous if widely adopted but has limited value to early converts. SPF requires widespread adoption to yield results and the cost and degree of effort has gained limited penetration. Early adopters have not achieved enough critical mass to attract the mainstream.

One can see that the SPF solution which requires the publishing of IP addresses from which legitimate email can originate for a DOMAIN could eliminate the forged addresses that spammers use in email. SPF, however, requires that each individual domain owner publish such a list. This requires significant time for each of millions of people to adopt. Publishing SPF policies is complex and prone to error. Many DNS service providers do not support it.

What is Needed is

The blacklist solution is objectionable to legitimate email users sharing the same IP addresses used by spammers and makes RBL lists less than ideal by harming innocent users. Increasingly, spam is emitted from bot networks which consist of computers which have been penetrated by malicious senders. The email sent from a bot may contain a mixture of spam caused by the infection and legitimate mail. Unfortunately putting a bot infected IP address on an RBL punishes the victim more than the criminal. It would be desirable to block only the spam emitted from a bot network.

One can appreciate that a single entity might build such a list using techniques not discussed or disclosed in this application. However, if such a list was available, it would be extremely useful to have it available in real time to anyone who wanted to make a query. This could be accomplished using a database, a webpage, or something based on the domain name system (DNS) by those skilled in the art. It can be appreciated that the existing RBL systems cannot support this list because they can only allow the lookup of a single IP address and because domains sharing an IP addressee are thereby indistinguishable.

Therefore it is one objective of this invention to provide an improved system for looking up domains and IP addresses in an efficient manner.

Thus it can be appreciated that what is needed is an efficient way to query a database from anywhere in the Internet, a high performance cachable storage of data which can reply to such queries, and a better way to look up the IP addresses of legitimate email senders so that their email can easily bypass filters. In more general terms, what is needed is a better way to distinguish legitimate email senders from spammers so that their email is efficiently delivered with less latency and resource consumption.

Summary of the Solution

The present solution has three parts which may operate independently or in combination. A general method for querying a database is disclosed. A general method of operating a database is disclosed. An application of the query—operation method is disclosed for facilitating the transmission of email.

The invention comprises a method for querying a remote database on the internet located at a domain name, the method comprising the steps following: appending a suffix containing the domain name to a first query argument; prepending a second query argument as a prefix to the first query argument; and sending a dns query to a dns resolver comprising questiontype=A, questionname=the fully qualified domain name, and questionclass=IN wherein prepending and appending includes inserting a delimiter to form a fully qualified domain name. The invention further comprises appending at least one query argument to the fully qualified domain name. The invention further comprises appending an authentication code as a query argument whereby a database can track and control access.

The invention comprises a method for operating a database comprising the steps of transmitting an IP address to a sender of a dns query; receiving a fully qualified domain name as the query name in a dns query from a dns client; and determining a first query argument and a second query argument from the fully qualified domain name.

The present invention selects email from legitimate senders and facilitates its transmission to receivers more efficiently while reducing the load on spam scanners. The method comprises: querying a database with a set of email parameters, and transmitting email according to the result of the query. The method further comprises transmitting the set of email parameters as concatenated labels in a string. The method further comprises extracting the email parameters by analyzing a TCP/IP header and an MAIL "FROM" command from an email envelope where the email parameters comprise at least an IP address of a client and a sender which is at least one of a local-part and a domain. In other words, the argument of the MAIL "FROM" command correctly includes <local-part@domain>. The set of email parameters comprises "domain" and "IP address". It may further comprise "local-part".

In an embodiment, the query comprises the step of an RBL-style lookup over the domain name system (DNS). However the content of the query is at least the domain of the email sender concatenated to the IP address of the client sending the MAIL 'FROM" command. The domain or the entire email address is extracted from the argument of the MAIL 'FROM" command. The method of the invention further comprises continuing the session to transfer the message body only if the reply from the reputation server determines the sender is not a spammer. In one embodiment, the database holds information on senders whose history does not include spam. In another embodiment, the email is transferred to an email filter for further analysis. In an alternate embodiment, the database holds information on senders who have a spam history, causing the email to be blocked. The invention is distinguished from conventional approaches which rely only on IP addresses.

The invention comprises transmitting the set of email parameters (sender domain or sender email address and the IP address of the sending email host) and receiving a status from a database. In an embodiment, concatenating the domain and IP address as labels to a RBL-like query elicits a status from a database.

ADVANTAGEOUS EFFECTS

The method of transmitting a query is efficient and avoids limitations in access into or out of networks. The method of replying to a query allows data to be cached close to the user.

The method facilitating email transmission uses a centralized database and does not depend on wide-spread adoption of a policy. No further effort on the part of a well-behaved email sender is required to establish his good reputation. Well-behaved email senders who share an email client used by spammers would not be penalized by having their mail blocked. The benefit of the invention is in reducing the load on spam scanners and expediting delivery of mail from legitimate email senders. By transmitting the query as a fully qualified domain name and receiving the response as an IP address, the result is cached in the distributed domain name system.

DETAILED DISCLOSURE OF QUERY CLIENT

Figure 1:
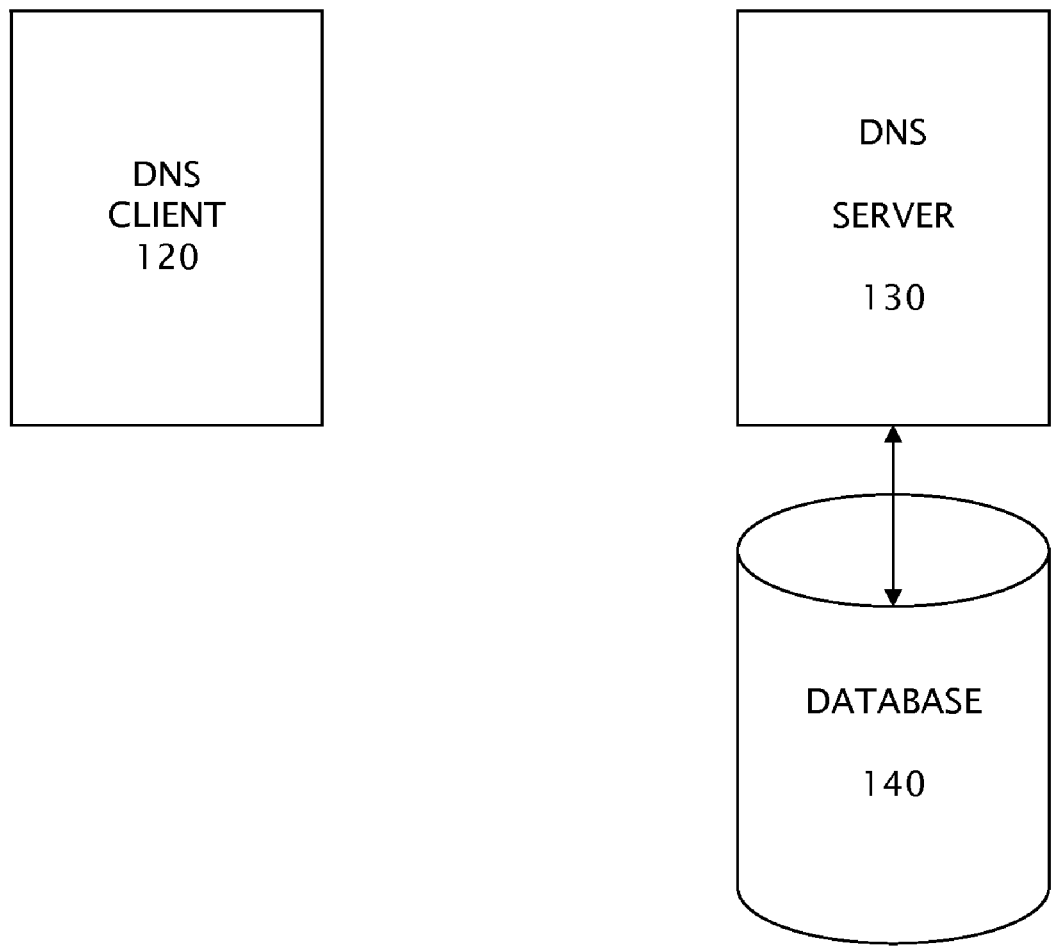
FIG. 1 is a block diagram of a dns system.
Figure 2:
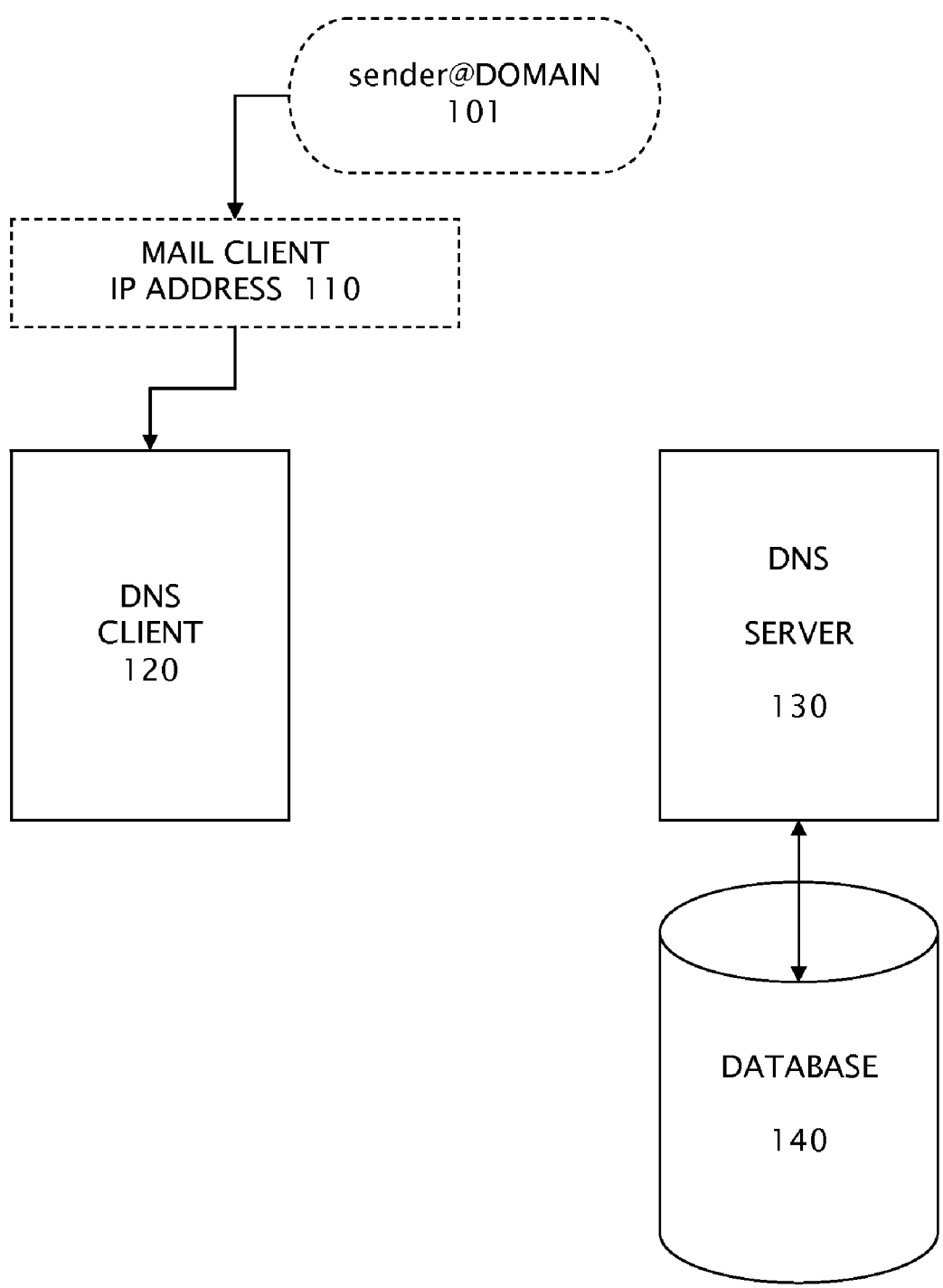
FIG. 2 is a flow chart of email entering the system.
Figure 3:
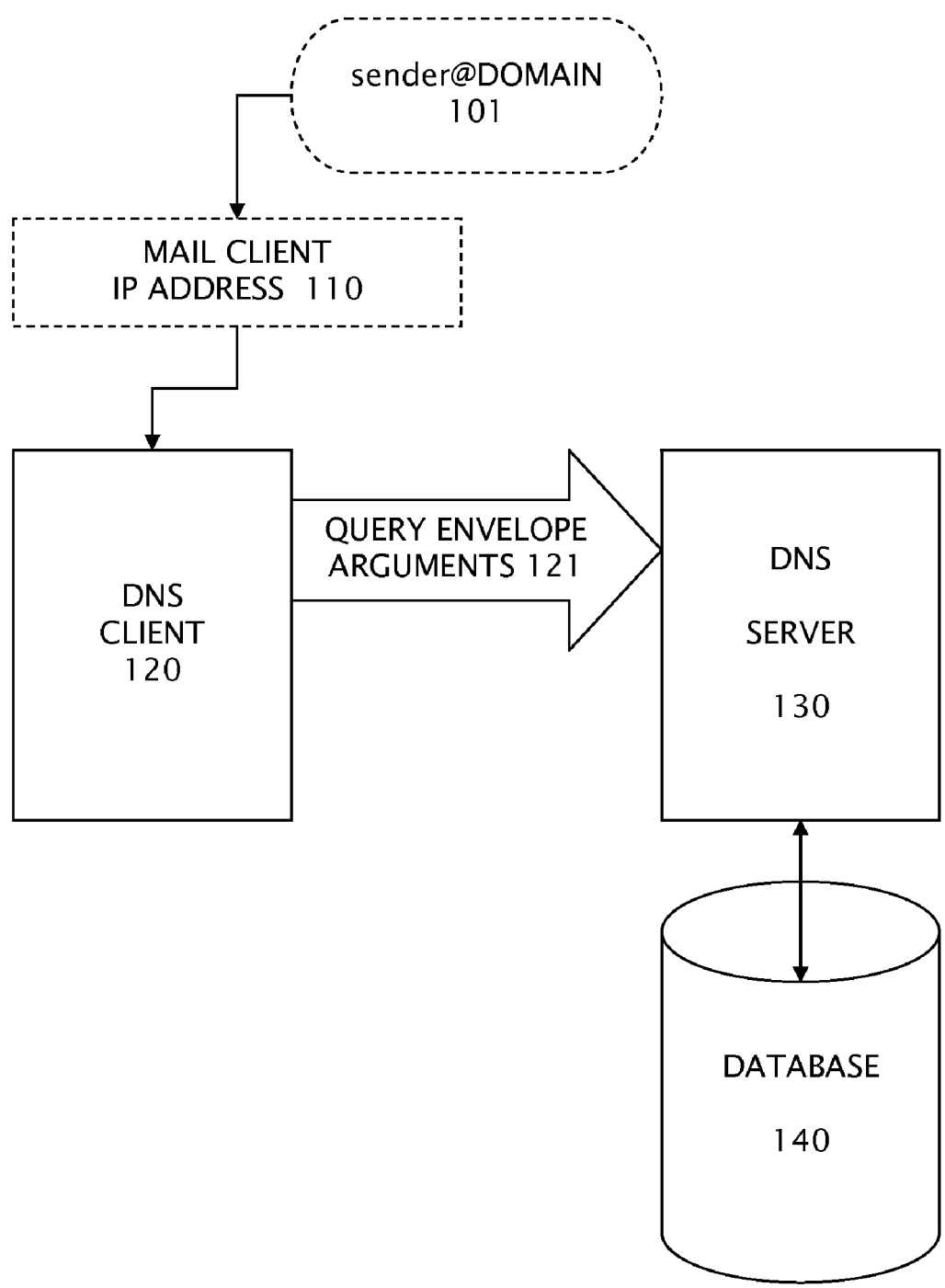
FIG. 3 is a flow chart of a query within the dns system.
Figure 4:
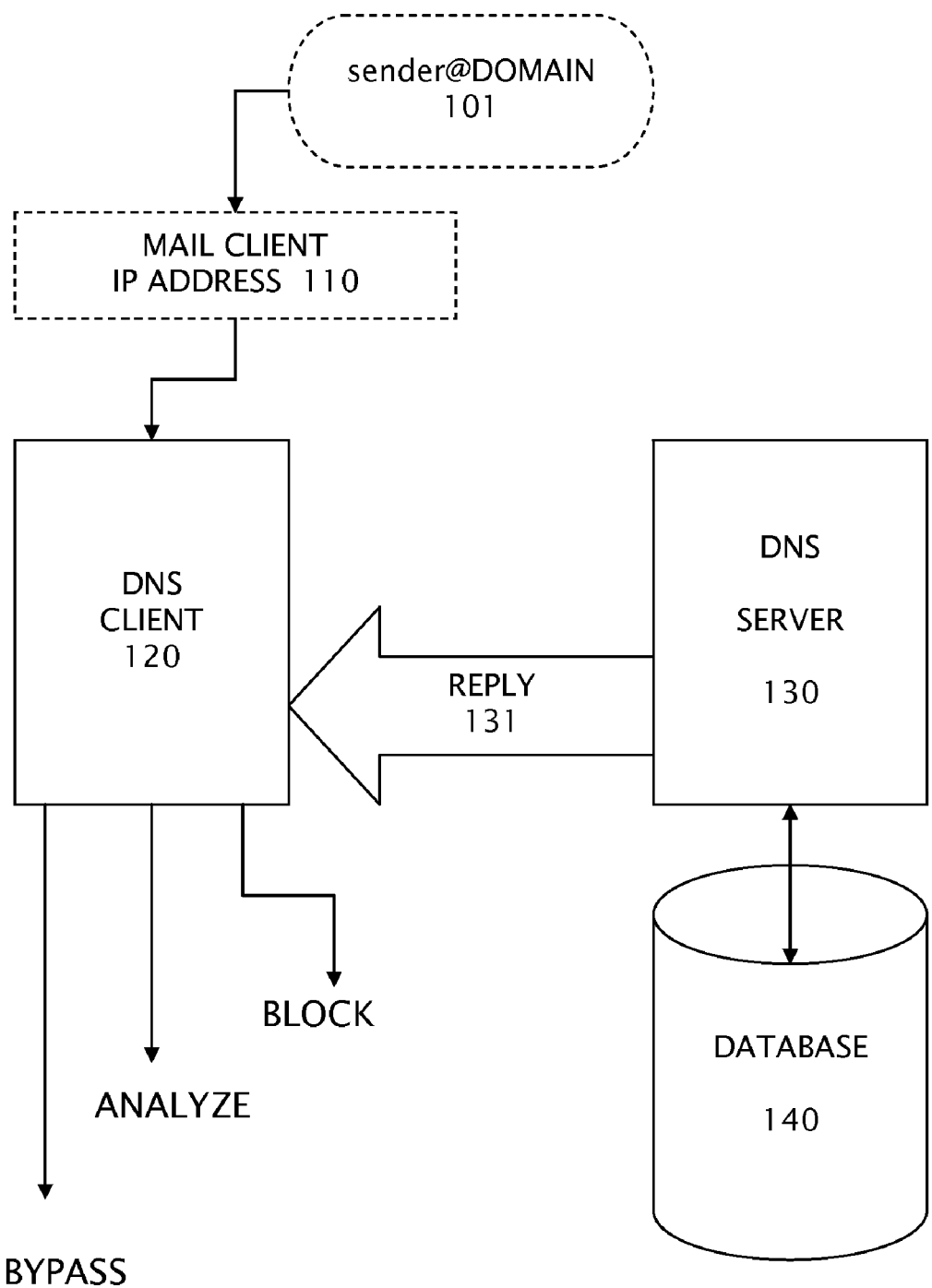
FIG. 4 is a process flow of email through the system.

The present application discloses a method for querying a database located on a network comprising:
 concatenating a plurality of query arguments;
 prepending the query arguments to a suffix to form a fully qualified domain name (FQDN) wherein a suffix is a dns server host; and
 sending a query on the FQDN in a domain name system (DNS).

More specifically the method for querying a database at a website has the following steps:
 sending a dns request of class=IN;
 concatenating a suffix of the website to a plurality of query arguments to form a string formatted as a fully qualified domain name,
 sending dns queryname=the fully qualified domain name to a domain name system; and
 receiving at least one data value encoded within an IP address format as a dns query response from the domain name system,
 wherein a fully qualified domain name comprises a plurality of labels separated by dots and ending with a domain, a top level domain and a dot.

The method further comprises sending a dns request selected from the following: type=A, type=AAAA, type=spf, type=CNAME, and type=TXT.

In an embodiment the IP address is one of two to the 32 power unique values of the IPv4 system (four octets).

In an embodiment the IP address is one of two to the 128 power unique values of the IPv6 system (eight groups of 4 hexadecimal digits).

The method further comprises steps storing the dns query response in cache in a distributed domain name system and serving to a dns resolver.

The IP address may represent one of a subjective probability on a scale, an action suggested, and a degree of additional handling.

By a plurality of query arguments we mean at least a first query term and a second query term separated by a dot.

In the present invention an IP address comprises a plurality of groups separated by dots wherein groups are one of binary numbers, decimal numbers, hexadecimal numbers and octal numbers.

The invention further supports access control by using a query argument for an authentication code, whereby billing records may be checked or updated and users of the database may be validated or rejected.

Detailed Disclosure of Database Server

The present invention is a method for operating a database on a network comprising: receiving a dns query, extracting a plurality of arguments from said query, retrieving information associated with said arguments, and transmitting a reply formatted in IP syntax.

A method for operating a database comprising the following steps:
 listening on a port in an embodiment port 53 for a dns request class=IN from a dns client;
 stripping the suffix off the dns queryname=fully qualified domain name which corresponds to the domain name of the website;
 determining at least two arguments from the remainder of the dns queryname;
 accessing a database according to the arguments; and
 transmitting the result as a dns query response to the dns query client.

In an embodiment the result is a text string or an IP address. The result may be coded as an IP address. The result may be multiple terms which are encoded by setting the octets or groups of an IP address.

In an embodiment the result may be encoded using either two to the 32 power unique values of the IPv4 system or two to the 128 power unique values of the IPv6 system.

In an embodiment, the dns query response is cached by a distributed domain name system and served to a client.

The method may further comprise determining an authentication code component of the remainder of the dns queryname, validating the authentication code before accessing a stored IP address, and transmitting the stored IP address as a dns query response.

The dns query response may be cached in a domain name system and served to a second client.

The method further comprises receiving an authentication code as a query argument and checking its validity.

The method further comprises storing a first use of an authentication code and associating it with the IP address of the query sender. This allows an authentication code to be tied to the first user.

The method further comprises incorporating at least one character of an authentication code received as a query argument in the reply. If the access to the database is shared among a group, the cached result may be made available to users who have authentication codes with a number of common characters even if the complete authentication code is unique to each member of the group.

Detailed Disclosure of Email Sender Reputation Checking

The present invention is a method for facilitating email delivery comprising extracting email parameters, querying a database of well behaved senders, receiving a reply based on the reputation of an email sender, and processing the email according to the reply.

In an embodiment the invention is a method for facilitating email delivery comprising extracting email parameters, querying a database of senders, receiving a reply based on the reputation of an email sender, and blocking the email from propagation when the email parameters match those of a spammer.

In an embodiment the invention is a method for facilitating email delivery comprising extracting email parameters, querying a database of well behaved senders, receiving a reply based on the reputation of an email sender, and setting a score on the email for further analysis when the email parameters do not match those of a legitimate sender.

In an embodiment the invention is a method for facilitating email delivery comprising extracting email parameters, querying a database of well behaved senders, receiving a reply based on the reputation of an email sender, and bypassing any additional filtering whereby email is transmitted to the recipient when the email parameters match those of a legitimate sender.

Specifically, the invention is a method for querying a database comprising the following steps:
 sending a dns request of class=IN;
 concatenating a suffix of the domain name of the database to a plurality of query arguments to form a string formatted as a fully qualified domain name,
 sending dns queryname=the fully qualified domain name; and
 receiving data as a dns query response,
wherein a fully qualified domain name comprises a plurality of labels separated by dots and ending with a domain, a dot, and a top level domain, wherein a first query argument is a domain of an email sender and a second query argument is a hostid of an email sender wherein a hostid is an IP address and wherein the dns request type is selected from the group A, AAAA, TXT, CNAME, and SPF.

In an embodiment the data represents one of a subjective probability of spam on a scale, an action suggested, and a degree of filtering.

In an embodiment the invention supports filtering email between an smtp client and an smtp server wherein smtp is simple mail transfer protocol, the method comprises
 forming at least one set of email parameters from an smtp session,
 querying a reputation server before completing the smtp session, and
 facilitating transmission of the email according to the reply from the reputation server.

In an embodiment forming a set of email parameters from an smtp session means the steps of extracting a sender email address from an smtp mail command and extracting a smtp client IP address from an IP header of the smtp session.

In an embodiment forming a set of email parameters from an smtp session means the steps of extracting a smtp client domain from an smtp EHLO command and extracting an smtp client IP address from an IP header of the smtp EHLO command.

In an embodiment the data received in response to a DNS query comprises a first IP address if there is a match and a second IP address if there is not a match within the database server.

In an embodiment, querying a database comprises appending a certain suffix to a string and querying a domain name system wherein a string comprises at least two envelope arguments concatenated in any order, wherein envelope arguments are selected from the following: a domain, an IP address, and a local-part of an email address.

INDUSTRIAL APPLICABILITY

Embodiments

The IPv4 and IPv6 system have very large capacity and can thus encode from two to the power of 32 up to two to the power of 128 unique values. A multidimensional database query is submitted as a string forming a fully qualified domain name to a dns server. If the exact query is soon repeated it will be served locally from a dns cache. The query may contain its own authentication code.

Text can also be served by a database in response to a domain name system query. Text fields may be requested by querying TXT instead of A or AAAA. The present invention applies to any query of a database which has a plurality of arguments which may have an implied AND or an implied OR if the arguments can be concatenated with delimiters such as a dot.

An email filter embodied as an apparatus or as a process preceding an smtp server may substantially reduce the load on the server by preventing smtp sessions with spammers to reach the point where data is transferred via the server.

The invention may be used to reduce the load on a spam scanner by preprocessing email. Email that originates from known good senders bypasses the spam scanner entirely. A further embodiment of the invention further reduces the load on a spam scanner by terminating a mail session which been initiated from a set of email parameters of a known spammer in a database containing spammers.

The system operates on a plurality of arguments which includes credit card numbers, accounts, passwords, values for computation, product order codes, service amounts, schedules, stock keeping units, universal product code, and a local part of an email address, an email domain, a text string following an "at" sign, a top level domain concatenated to a hostname, a text string extracted from the argument of a MAIL from command, a text string extracted from a "return-path" value, a text string extracted from a MAIL FROM field in a mail body, and a top level domain of an email sender and the label to the left of the top level domain.

The system further operates on arguments which includes authorization codes, signatures, hashes, quantities, qualities, indexes, position on lists, votes, preferences, likes/dislikes, strengths, weaknesses, percentages, probabilities, laws, speeds, identification parameters, and an IP address from a TCP packet, an IP address associated with an TCP connect, an IP address associated with an SMTP command, an IP address associated with an email header, an IP address associated with a UDP session, an IP address associated with a telnet session, and an IP address associated with an Internet Engineering Task Force request for comment protocol.

The present invention sends a plurality of arguments to a service which may enable or disable a process, license use of intellectual property, admit or deny access, perform a computation or financial transaction, move funds, vote, poll, sample, handle material, collect data, and measure a continuous process.

Method Embodiments in a Computer System

An embodiment of the invention is an article of manufacture comprising computer readable media encoded with instructions to adapt the operation of a processor.

An embodiment of the invention is an apparatus comprising a computing system and the above article of manufacture.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

CONCLUSION

The present invention is distinguished by concatenating a plurality of query arguments into a string with a suffix to form a fully qualified domain name. The present invention is distinguished by sending a query with a plurality of arguments to a domain name system. The present invention is further distinguished by appending an authentication code to a query submitted to a domain name system. The present invention is distinguished by matching a plurality of query arguments in a database and replying with a response in the form of query reply. Performance may be improved due to caching of the reply in the domain name system.

The present invention is distinguished from conventional anti-spam filtering methods (which typically block identified spammers) by focussing on identifying legitimate email senders and facilitating transmission of their email with minimum processing. The method assumes the existence of a database generated and managed outside of the scope of the present invention. This database contains the email parameters of email senders who have a history of sending email which is not spam. The method of operating such a database in response to queries is also outside of the scope of this patent application and is known to those skilled in the art of database administration. The present invention is distinguished from conventional systems by preparing, and transmitting a multidimensional query in contrast to a uni-dimensional IP address query. The present invention is further distinguished by expediting email through to the receiver when the multidimensional query results in a match in the legitimate sender database. Bypassing further filtering consumes less resource and improves prompt delivery rather than adding delay and processing cost.

The present invention relies on a reputation database of email parameters comprising at least email sender domains and associated IP addresses of legitimate email senders. It is well known among those skilled in the art how to compile the information by observing past email logs.

In an embodiment, the process of the invention comprise extracting both an IP address associated with the email sender and the domain of the sender, concatenating them into a single query, transmitting the query to a reputation database, receiving a match, and facilitating the transmission of the email according to the result.

It is the objective of the present invention to recognize the good behavior of email senders in a reputation advisor which distinguishes them from spam operators without burdening them with addition tasks in signing or authenticating their mail and systems. And in many cases legitimate non-spam senders do not control access to the mail servers their internet service providers utilize or the fraudulent use of their email addresses by spam senders. The present invention is distinguished from conventional remote block lists which use only IP addresses by using a set of email parameters which provide two, three, or more dimensions.

The present invention comprises an email facilitation apparatus which receives email, formulates a query, receives a reply code and controls the transmission of the email. In an embodiment the method of forming an email parameter query comprises extracting and assembling the domain of an email sender and the host id of the SMTP client employed. The invention further comprises a reputation server apparatus which receives a query and determines and sends a reply code.

The present invention, illustrated by the above discussion of email filtering, applies to other requests for services, electronic commerce, data communication, accumulation, processing, and process control. Stated more generally the present invention comprises a method comprising formulating a fully qualified domain name (FQDN) by concatenating a plurality of arguments to a host name, said host name associated with a service, sending a domain name system query from a resolver, receiving a domain name system query from the resolver, operating a service by inputting a plurality of arguments, formulating a reply encoded as text or an IP address wherein said IP address may be IPv4 or IPv6 format, transmitting said reply to said resolver, receiving said reply, and at least one of the following, facilitating transmitting an email to a recipient, blocking an email from transmission to a recipient, concluding a transaction, closing a session, acknowledging a request, displaying a message or image associated with said reply IP address, enabling software based on said reply IP address, licensing use of intellectual property based on said reply IP address, releasing a controlled physical matter based on said reply IP address, and providing a service based on said reply IP address.

The above discussion and description includes illustrations to support the understanding and appreciation of the invention but should be recognized as not limiting the scope which is defined by the claims following:

Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for querying a database, the database neither containing domain names nor Internet Protocol addresses, the method comprising:
concatenating a suffix of the domain of the database to a plurality of query arguments to form a string formatted as a fully qualified domain name;
sending a Domain Name System (dns) request of class=IN to a database configured to operate as a dns server utilizing well known port 53;
said dns request comprising queryname=the fully qualified domain name; and
receiving data as a dns query response comprising up to two to the power 128 unique values encoded in IPv6 format from said dns server, wherein said response is not a Resource Record (RR) of a Domain Name System and wherein the fully qualified domain name comprises a plurality of labels separated by dots and ending with a domain, a dot and a top level domain.

2. The method of claim 1 wherein the data represents an action suggested.

3. An article of manufacture comprising non-transitory computer readable media encoded with instructions to configure the operation of a processor to perform a method, the method comprising:
concatenating a suffix of the domain of the database to a plurality of query arguments to form a string formatted as a fully qualified domain name;
sending a Domain Name System (dns) request of class=IN to a database configured to operate as a dns server utilizing well known port 53;
said dns request comprising queryname=the fully qualified domain name; and
receiving data as a dns query response comprising up to two to the power 128 unique values encoded in IPv6 format from said dns server, wherein said response is not a Resource Record (RR) of a Domain Name System and wherein the fully qualified domain name comprises a plurality of labels separated by dots and ending with a domain, a dot and a top level domain.

4. A computer system, or other apparatus adapted to perform the functions:
concatenating a suffix of the domain of the database to a plurality of query arguments to form a string formatted as a fully qualified domain name;
sending a Domain Name System (dns) request of class=IN to a database configured to operate as a dns server utilizing well known port 53;
said dns request comprising queryname=the fully qualified domain name; and
receiving data as a dns query response comprising up to two to the power 128 unique values encoded in IPv6 format from said dns server, wherein said response is not a Resource Record (RR) of a Domain Name System and wherein the fully qualified domain name comprises a plurality of labels separated by dots and ending with a domain, a dot and a top level domain.

5. The computer system of claim 4 further adapted to perform the function:
providing a service based on said reply.

6. The computer system of claim 4 further adapted to perform the function:
concluding a transaction.

7. The computer system of claim 4 further adapted to perform the function: closing a session.

8. The computer system of claim 4 further adapted to perform the function:
acknowledging a request.

9. The computer system of claim 4 further adapted to perform the function:
displaying a message or image associated with said reply.

10. The computer system of claim 4 further adapted to perform the function:
enabling software based on said reply.

11. The computer system of claim 4 further adapted to perform the function:
licensing use of intellectual property based on said reply.

12. The computer system of claim 4 further adapted to perform the function:
releasing a controlled physical matter based on said reply.

* * * * *